July 2, 1968  J. B. EATON, JR  3,390,831
BISTABLE VALVE STRUCTURE
Filed Dec. 16, 1966

INVENTOR
JAMES B. EATON, JR.

BY Watson, Cole,
Grindle & Watson
ATTORNEYS

United States Patent Office 3,390,831
Patented July 2, 1968

3,390,831
BISTABLE VALVE STRUCTURE
James B. Eaton, Jr., Owensboro, Ky., assignor to Texas Gas Transmission Corporation, Owensboro, Ky., a corporation of Delaware
Filed Dec. 16, 1966, Ser. No. 602,192
5 Claims. (Cl. 230—228)

ABSTRACT OF THE DISCLOSURE

This disclosure relates to structure for opening and closing valves of the type used in compressors and the like for regulating flow of fluids (gases), wherein the valves basically attain either an open or closed position respectively in a fluid flow path to permit or stop flow of the fluids therethrough. The movement of the valve from open to closed positions generally is attained from force, pressure or energy exerted by the fluid upon the valve. The valve operates by means of a bistable mechanical mechanism such as a spring which attains one of two limiting positions but which is astable and cannot remain in intermediate positions. The spring may be forced from one position to the other by pressure of the fluids or by temperature of the fluid when the spring is a thin blade of bi-metallic structure which bends under the influence of temperature.

---

This invention is related to the co-pending application, Ser. No. 582,660, filed Sept. 28, 1966, for "Magnetically Biased Compressor Check Valves," which discloses bistably operated valves dependent upon the magnetic field relationship of two permanent magnets, one of which is carried by the movable valve.

The invention provides for control and structure of compressor check valves and the like for regulating fluid (gas) flow.

In conventional compressor pump check valves operated by spring pressure the pump has to work continually against the force of the spring and thus is inefficient. Furthermore, during certain portions of the pumping cycle, such valves tend to flutter and vibrate causing erratic pumping operation and short life. While magnetically biased valves have been used to overcome this deficiency, there are some environments where it is impractical to use magnets because of high temperatures, extreme shock, or space limitations.

Accordingly, it is a general object of this invention to provide improved bistably operable valve structures.

Another object of this invention is to provide simplified low-cost long-life valves which can improve pumping efficiency in compressors or the like.

Therefore, this invention provides valves with bistable spring structure forcing them into open and closed limiting positions with astable intermediate partially open positions operable in a compressor unit to improve the compressor efficiency. The valves themselves are operable in any suitable fluid flow path and may be forced into their two bistable positions by fluid energy such as pressure or temperature. In the latter case, the bistable spring structure is a thin bi-metallic plate which is bent through its astable position by medium of the fluid temperature.

Various aspects of the invention are described in detail in the following specification with reference to the accompanying drawings, wherein.

Figure 1:
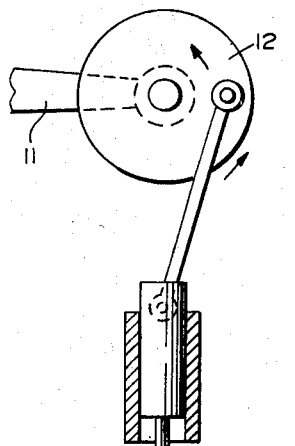
FIGURE 1 is a diagrammatic sketch, partly in section of a typical compressor mechanism illustrating operational characteristics utilized by the present invention.

As seen from FIGURE 1, a compressor pump unit is driven by a motor or the like through shaft 11 and flywheel 12 to reciprocate piston 14 back and forth in cylinder 15. Air, gas, or some other fluid is taken into inlet passageway 16 and is compressed in cylinder 15 by action of piston 14 to pass out of outlet passageway 17 at increased pressure.

In operation, the valves 20, 21, 22, and 23 are schematically shown in the upstroke position of piston 14. Thus, inlet valve 21 in the upper cylinder portion is held closed by pressure inside cylinder 15 and outlet valve 20 is pushed open to let the compressed air out of the cylinder into outlet passageway 17. In the lower cylinder portion, suction of piston 14 serves to draw closed the outlet valve 22 and to open inlet valve 23 to permit cylinder 15 to receive a fresh charge of noncompressed air from inlet passageway 16. Conversely, this relationship changes as the piston reaches its uppermost position and starts downwardly so that air is taken into the upper cylinder portion and is removed from the lower portion.

Figure 3:
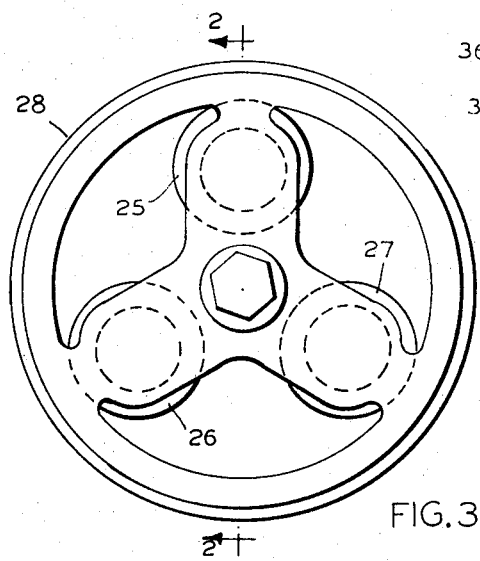
FIGURES 2 and 3 are respectively side section and plan views of a three poppet compressors valve assembly embodying the invention.
Figure 2:
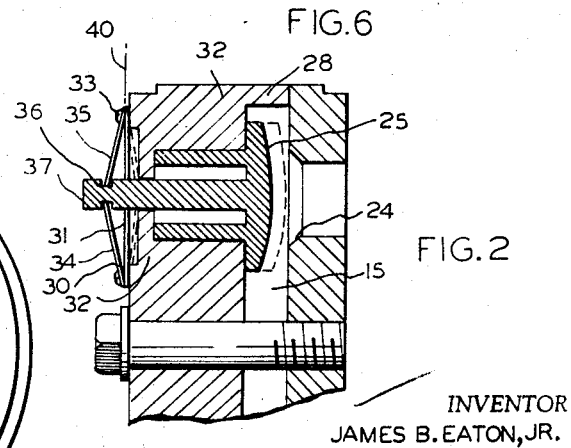

Typical poppet valve type structure for this mode of compressor operation is shown in FIGURES 2 and 3, where three separate poppet valves 25, 26, 27 held in framework 28, permit air to flow for example, from within cylinder 15 to outlet passageway 17.

Figure 4:
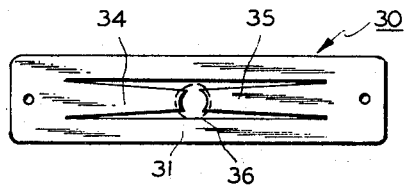
FIGURE 4 is a plan view of one bistable spring embodiment operable in accordance with the requirements of the invention.

The valve 25 shown in FIGURE 2 is held in either closed or open position by a generally flat leaf spring affixed to the valve assembly framework 32 by means of screws 33 or the like. As seen from the plan view of FIGURE 4, the spring has a flat outer circumference 31 from which extends centrally two movable arms 34, 35 which concentrically engage the ridge 36 in the valve stem 37 to ride back and forth through the plane of the outer circumference 31 as the valve 25 goes from open to closed position relative to valve seat 24. Thus, the arms 34, 35 take either the position shown in FIGURE 2 or the alternate position shown in phantom.

The spring may be either metallic or plastic and operates in bistable by medium of the fact that the arms 34, 35 are long enough to extend past the nominal position of the ridge 36 of the valve stem 37 when it is in the plane of the flat circumferential portion 31 of the generally flat spring plate 30. Thus, the arms 34 and 35 must be bent or deformed in the center plane to give an astable position in which it will not remain without being held with external equal and opposite forces from both sides overcoming the spring deformation pressure. However, if the spring arms 34, 35 are forced away on either side of the center plane with the axis 40 shown in FIGURE 2, it will reach a stable position in which the arms rest in the ridge 36 of stem 37 without being longitudinally compressed. Therefore, the valve 25 may be forced by normal compressor action to reside in either the fully open or fully closed valve positions achieving the hereinbefore described desirable compressor efficiency.

Figure 5:
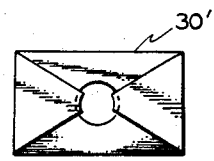
FIGURES 5 and 6 are respectively a top and side view of a further bistable spring embodiment.
Figure 6:
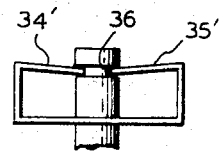

The bistable spring may be of different structural form in attaining the desired operation. One other example is the configuration of FIGURES 5 and 6 where the modified spring 30' need not be generally flat or planar.

Internal thermostatic control is attained when the arms 34, 35 of spring 30 are made of thin bi-metallic sheet material which bends with changes of temperature to force the spring automatically into fully open or fully closed stable positions. This embodiment could be used as a thermostatic valve in the circulation system of an automobile for example, or could be used to provide open valve relief to a compressor unit normally operating at high efficiency near its maximum temperature rating should it become overheated.

It is evident therefore that this invention provides a novel compressor valve combination operating in a more efficient and improved mode and novel valve structure which is useful to more efficiently control the flow of fluids such as air, gas, or water. Having therefore described the nature of the invention in the foregoing specification, those features of novelty descriptive of the spirit and scope of the invention are set for forth with particularity in the appended claims.

What is claimed is:

1. A compressor system comprising in combination, low pressure fluid intake means, higher pressure fluid discharge means, a compressor cylinder, separate valves movable relative to the cylinder communicating between said cylinder and the respective intake and discharge means to open and close passageways from the cylinder to the respective intake and discharge means solely in response to relative fluid pressures between the cylinder and the respective intake and discharge means, and an actuator spring for at least one of the valves consisting of a bistable spring engaging both the valve and the cylinder structure thereby holding the valve in a stable fully open or fully closed position and providing an intermediate unstable position.

2. Valve structure comprising in combination, a movable valve with a stem having a notch therein, means moving the valve to two limiting positions, a valve seat receiving the movable valve in registration in a closed one of said positions, and astable biasing means engaging said notched stem thereby urging the movable valve stably into either one of said limiting positions and unstably holding the valve at an intermediate position between the two limiting positions with a force urging the movable valve into one of the limiting positions, wherein the biasing means constitutes a spring member which engages the valve formed as a leaf spring with two arms defining an aperture centrally disposed therein engaging said notch in said stem, said arms having a length sufficient to loosely engage said notch at either of the two limiting positions but long enough to be deformed as the valve passes through said astable intermediate position.

3. Valve structure as defined in claim 2 wherein the spring member comprises a generally flat leaf spring with its two arms engaging the notch, with the arms and the spring body generally disposed in a single plane.

4. Valve structure as defined in claim 2 wherein the spring member comprises a generally flat leaf spring constructed of a bimetallic material which bends with changes of temperature to urge the spring from one stable position to the other.

5. Valve structure as defined in claim 2, wherein the spring member comprises a leaf folded to be disposed in substantially two planes with said arms residing in a single one of said planes.

References Cited
UNITED STATES PATENTS

| | | | |
|---|---|---|---|
| 1,990,747 | 2/1935 | Netschert | 251—75 XR |
| 2,521,891 | 9/1950 | Beams | 251—75 |
| 2,970,608 | 2/1961 | Doeg | 230—228 XR |

ROBERT M. WALKER, *Primary Examiner.*